Oct. 26, 1965  D. C. WRIGHT  3,213,737
APPARATUS FOR CUTTING SHEET MATERIAL
AGAINST A DIE WITH A ROLLER
Filed Dec. 16, 1963  2 Sheets-Sheet 1

INVENTOR.
DAVID C. WRIGHT
BY
Oldham & Oldham
ATTYS.

Oct. 26, 1965  D. C. WRIGHT  3,213,737
APPARATUS FOR CUTTING SHEET MATERIAL
AGAINST A DIE WITH A ROLLER
Filed Dec. 16, 1963  2 Sheets-Sheet 2

INVENTOR.
DAVID C. WRIGHT
BY
*Oldham & Oldham*
ATTYS.

United States Patent Office 3,213,737
Patented Oct. 26, 1965

3,213,737
APPARATUS FOR CUTTING SHEET MATERIAL
AGAINST A DIE WITH A ROLLER
David C. Wright, Cuyahoga Falls, Ohio, assignor to The
Falls Engineering & Machine Company, Cuyahoga
Falls, Ohio, a corporation of Ohio
Filed Dec. 16, 1963, Ser. No. 330,881
5 Claims. (Cl. 83—461)

This invention relates to roller die apparatus wherein sheet-like material is clamped against a rule type die by a cutting plate which is engaged progressively by a pressure roller to effect the cutting action of the sheet-like material against the ruler die.

The present invention constitutes an improvement upon or a modification of the cutting apparatus disclosed and claimed in U.S. Patent No. 3,077,807, granted February 19, 1963, and entitled "Roller Die Apparatus."

It is the general object of the present invention to provide relatively inexpensive, readily operated apparatus for quickly and accurately cutting sheet-like materials, and particularly natural and synthetic foam material into desired shapes.

Another object of the invention is the provision of apparatus wherein a relatively thin and flexible cutting plate is utilized to clamp foam or other sheet-like materials against a cutting die with a pressure roller progressively engaging with the cutting plate to effect the progressive cutting of the material against the die.

The foregoing objects of the invention, and other objects which will become apparent as the description proceeds, are achieved by the combination in a roller die apparatus of a bed, a cutting die having an effectively flat under surface supported on the bed and knife-like cutting edges extending upwardly of the die and terminating in a plane parallel to the bed and adapted to receive a work piece to be cut, a cutting plate, means mounting the cutting plate spaced from the work piece resting on the cutting edges of the die, means for moving the mounting means to clamp the work piece against the cutting edges of the die with the cutting plate, a roller, means carrying the roller for rolling movement over the cutting plate to progressively force the work piece against the cutting edges of the die to cut the work piece, and means for adjusting the distance between the bed and the plane of the rolling movement of the roller to effect the desired cutting action.

Figure 1:
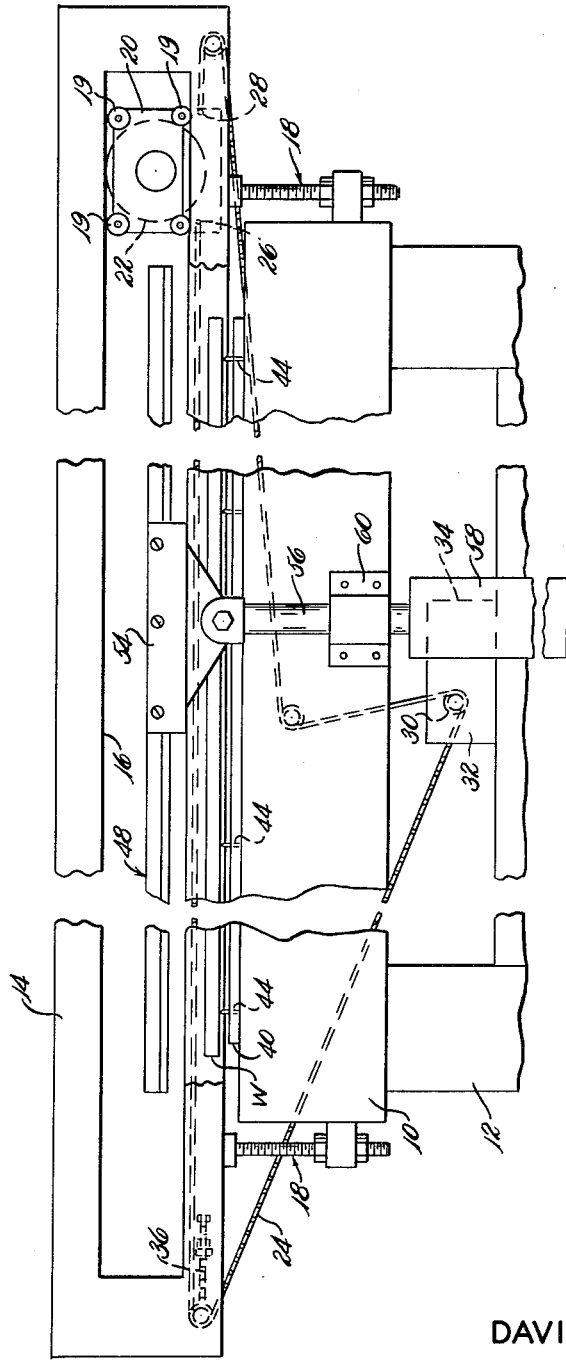
Figure 2:
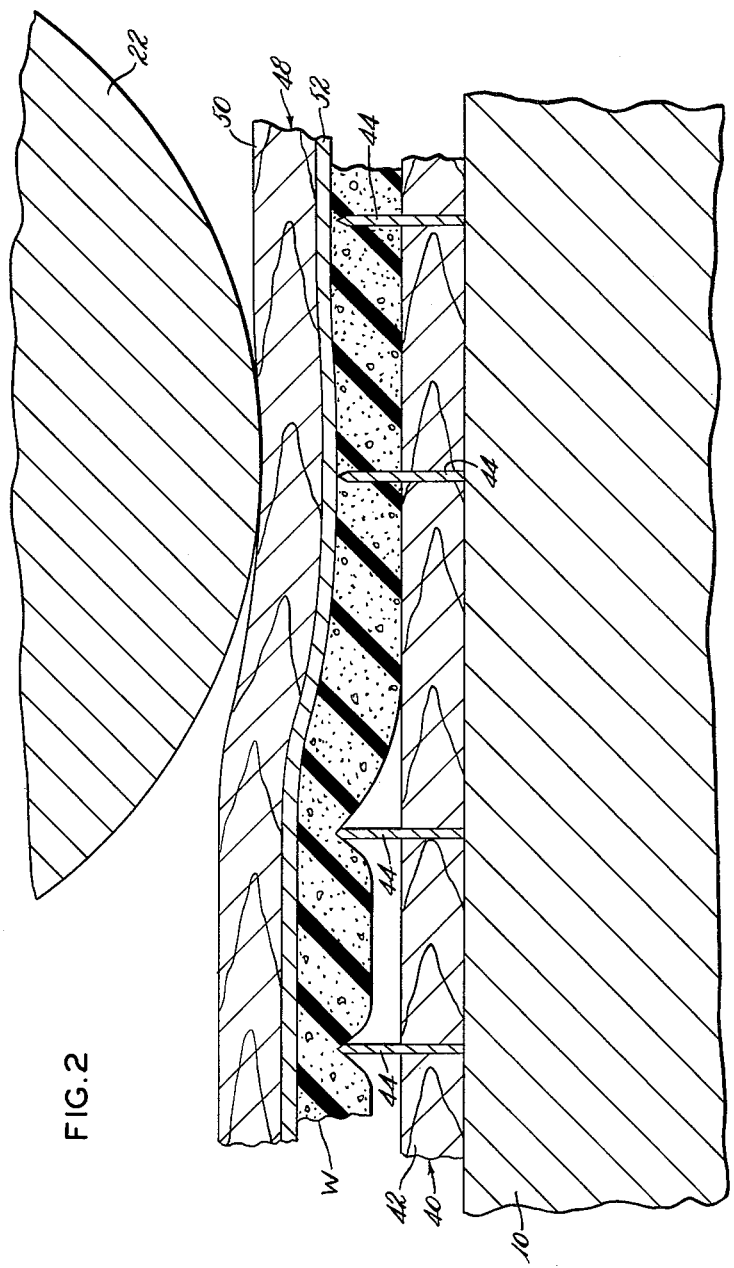

For a better understanding of the invention reference should be had to the accompanying drawings wherein:

FIGURE 1 is a side elevation, partially broken away, of apparatus incorporating the principles of the invention; and FIGURE 2 is an enlarged fragmentary cross sectional view better illustrating the details of the cutting action.

In the drawings, the numeral 10 indicates a flat, elongated, usually horizontal, bed of rectangular shape supported upon a base 12. Mounted at each elongated side of the bed 10 are vertically extending plates 14 having windows 16 therein. A portion of the plate 14 nearest the side of the apparatus seen in FIGURE 1 has been broken away to better show the inner portion of the apparatus. The vertical position of the plates 14 in relation to the bed 10 is made adjustable by any suitable means, such as screws and lock nuts 18.

Slidably positioned in each window 16 upon wheels 19 is a carriage 20, and the carriages 20 rotatably mount between them a pressure roller 22. The carriages 20 are adapted to be moved back and forward in the windows 16, passing over the top of the bed 10, and this movement can be effected by appropriate means such as a chain 24 connected at an end 26 to one side of the carriage and at the end 28 to the other side of the carriage, the chain extending around appropriate idler sprockets and driven by a sprocket 30 mounted on the output shaft of a gear reducer 32 which is driven by an electric motor 34. Adjustable screw means 36 engaging the bearings of one of the chain idler sprockets provides for adjustment of the chain length 24 as the vertical plates 14 are adjusted up or down by the screw means 18.

The apparatus as just described is of the general type disclosed and claimed in U.S. Patent No. 2,772,736 except that in the present apparatus the carriages 20 are positively moved by the chain drive mechanism back and forth in the window 16, but the roller 22 is usually not driven but is free to turn in its journals in the carriages as the surface of the roll is engaged during the cutting operation as hereinafter described.

Positioned upon the bed 10 of the apparatus is a die, indicated as a whole by the numeral 40, having upstanding cutting edges in the desired shape or shapes and contours, the cutting edges normally terminating in the same plane parallel to the surface of the bed 10. Usually the die 40 takes the form of a ruler die which is made up from a sheet of plywood, for example ⅝ inch thick, the plywood having jigsaw or band saw slots cut completely through it to the desired die shapes, with the saw slots then receiving flexible steel strips 44, as best seen in FIGURE 2, having their upper edges sharpened. Because the metal strips 44 approximate the cross section of a steel rule, dies made in this manner have been called ruler dies.

A work piece W of sheet-like material is laid upon the cutting edges of the die 40, and in the form of the invention illustrated the work piece W typically comprises a piece of foamed resilient polyurethane, for example, ⅝ of an inch thick.

Positioned above the work piece W is a cutting plate indicated as a whole by the numeral 48. The cutting plate is semi-flexible and resilient, and is typically constructed from a piece of plywood 50 between about ⅜ of an inch and about ⅞ of an inch in thickness, usually about ⅝ of an inch thick, and secured to the underside of the plywood is a steel sheet 52 between about 1/16 of an inch and about 3/16 of an inch thick, usually about ⅛ of an inch thick.

The cutting plate 48 is gripped at its opposed lateral edges by means of brackets 54 which are usually pivotally fastened to piston rods 56 of fluid pressure cylinders 58 secured to the sides of the base 12. Brackets 60 secured to the sides of the bed 10 may be provided to assist in guiding the movement of the piston rods 56. Only one fluid pressure cylinder 58 is usually employed at each side of the cutting plate 48, but several can be used if greater clamping action is desired.

The operation of the fluid pressure cylinders 58 moves the cutting plate 48 to a position sufficiently remote from the work W so that the pieces cut by the die 40 from the work piece can be removed, together with scrap portions of the work piece, and a new work piece positioned on the die 40. Then operation of the fluid pressure cylinders 58 in the opposite direction clamps the cutting plate 48 down against the upper surface of the work piece W in the manner best seen to the left of FIGURE 2 of the drawings.

Now the motor 34 is energized to move the carriages 20 in the windows 16 and to progressively move the roller 22 over the upper surface of the cutting plate 48 in the manner best seen to the right of FIGURE 2 of the drawing. This effects the progressive cutting of the work piece W against the cutting edges of the die 40, the cutting plate 28 bending resiliently in the direction of its length during this operation whereby the cutting action of the roll approaches that which would be achieved by a roll of infinite diameter.

It is to be noted that the pressure of the roller 22 acts in the same direction as the clamping pressure upon the cutting plate 48 so that the cutting pressure upon the work piece W is a combination of the roller pressure and the clamping pressure. The cutting plate 48 moves closer to the surface of the bed 10 as the cutting action progresses. If the work piece cut is of less thickness than the distance that the cutting edges extend above the base portion of the die 40, then the cutting plate 48 after the cutting action rests against the cutting edges of the die. When the work piece W is of greater thickness, as is the case illustrated in FIGURE 2 the cutting plate 48 moves a short distance away from the cutting edges after the cutting operation if the force exerted by the compressed work piece W is greater than the clamping pressure effected by the fluid pressure cylinders 58.

In the form of the invention illustrated, the pressure roller 22 is freely journalled at its ends in the carriages 20 and is not positively driven. It is only the frictional engagement between the surface of the roller 22 and the cutting plate 48 which causes the roller 22 to revolve during its rolling movement over the cutting plate 48, all in the manner shown in FIGURE 2. Of course, the screws 18 are appropriately adjusted so that in the rolling movement of the roller 22 over the surface of the cutting plate 48 the cutting plate 48 is moved down to engage with the cutting edges of the die 40 with a sufficient force to effect the cutting action of the work piece W without pressing the cutting plate 48 so tightly against the cutting edges that the cutting plate, and particularly the steel sheet 52 thereof, would be marked objectionably by the cutting edges.

Upon completion of the progressive roller cut in the manner described the cutting plate 48 is moved a sufficient distance away from the workpiece W by the operation of the fluid pressure cylinders 58 so that the workpieces cut and the scrap can be removed and a new workpiece positioned over the cutting edges of the die 40. After the cutting plate 48 has been moved out of the way as described, other mechanism (not shown) may move the die 40 off of the bed 10, invert it, or perform other operations to facilitate unloading of cut pieces and/or scrap from the die. Sometimes the work piece W can be in the form of a continuous strip of material which can be advanced the necessary distance between each cutting operation to present a new portion of the strip of material to be cut. A cutting stroke can be effected by the roller 22 as it moves from right to left over the cutting plate 48, and another cutting stroke as the roller 22 moves from left to right over the cutting plate. Or, cutting can be effected by roller 22 in only one direction of movement with the roller then being returned to its initial position before effecting a second cutting stroke.

The apparatus of the invention provides excellent cutting accuracy on the work piece with the cuts effected being at right angles, and with a minimum of material distortion. It is possible to trim molded work pieces with the apparatus.

While a certain representative embodiment and details have been shown for the purpose of illustrating the invention, it will be apparent to those skilled in this art that various changes and modifications may be made therein without departing from the spirit or scope of the invention.

What is claimed is:

1. The combination in a roller die apparatus of a stationary bed, an elongated cutting die having an effectively flat under surface supported on the bed and knife-like cutting edges extending upwardly of the die and terminating in a plane parallel to the bed and adapted to receive a work piece to be cut, a cutting plate of substantially the same size as the bed, means mounting the cutting plate spaced in parallel relation from a work piece resting on the cutting edges of the die, means for moving the mounting means to clamp the work piece with a continuous uniform pressure over its entire surface against the cutting edges of the die with the cutting plate, a roller of a length at least equal to the width of the die, means carrying the roller for rolling movement over the cutting plate to progressively force the work piece against the cutting edges of the die to cut the work piece, and means for adjusting the distance between the bed and the plane of the rolling movement of the roller to effect the desired cutting action.

2. The combination defined in claim 1 wherein the cutting plate is relatively thin and flexible and has a metal under surface which engages with the cutting edges of the die upon completion of the progressive cutting action, and the cutting plate resiliently and progressively bends as the roller moves thereover.

3. The combination defined in claim 1 wherein the means moving the mounting means for the cutting plate continue to function during the movement of the roller over the cutting plate so that the force of the moving means and the force of the roller act together to effect the cutting of the work piece, with the cutting plate repositioning itself closer to the bed after the passage of the roller thereover.

4. In a roller die apparatus the combination of,
   a stationary bed,
   a cutting die having an effectively flat undersurface supported on the bed and knife-like cutting edges extending upwardly of the die and terminating in a plane parallel to the bed and adapted to receive a work piece to be cut,
   a relatively thin and flexible cutting plate of substantially the same size as the bed having a metal undersurface adapted to engage with the cutting edges of the die,
   means counting the cutting plate in parallel spaced relation from a work piece resting on the cutting edges of the die,
   means for moving the mounting means to force the work piece with the cutting plate with a continuous uniform pressure over its entire surface against the cutting edges of the die,
   a roller,
   means carrying the roller for pressure rolling movement over the cutting plate so that the force of the moving means and the force of the roller act together to progressively force the work piece against the cutting edges of the die to cut the work piece with the cutting plate repositioning itself closer to the bed after the passage of the roller thereover because of the continuous force of the moving means, and
   means for adjusting the distance between the bed and the plane of the rolling movement of the roller to properly achieve the desired cutting action.

5. The combination defined in claim 4 where the cutting plate is formed of plywood between about 3/8 and about 7/8 inch thick, and it is covered on its lower surface with a steel plate between about 1/16 and about 3/16 inch thick.

References Cited by the Examiner

UNITED STATES PATENTS

| | | | |
|---|---|---|---|
| 1,129,876 | 3/15 | Latham | 83—510 |
| 1,505,212 | 8/24 | MacDonald | 83—511 |
| 2,121,004 | 6/38 | Balfe | 83—531 |
| 2,217,060 | 10/40 | Korsen | 83—510 |
| 2,772,736 | 12/56 | Campbell | 83—510 |
| 3,024,688 | 3/62 | Romm | 83—510 X |
| 3,077,807 | 2/63 | Wright | 83—532 |

ANDREW R. JUHASZ, *Primary Examiner.*